United States Patent [19]

Grasselli et al.

[11] 4,377,500

[45] Mar. 22, 1983

[54] CATALYSTS

[75] Inventors: R. K. Grasselli, Chagrin Falls; D. D. Suresh, Macedonia; R. J. Zagata, Seven Hills; G. E. Force, Richmond Heights, all of Ohio

[73] Assignee: The Standard Oil Co., Cleveland, Ohio

[21] Appl. No.: 281,160

[22] Filed: Jul. 8, 1981

[51] Int. Cl.³ .................. B01J 21/08; B01J 21/16; B01J 27/02

[52] U.S. Cl. .................. 252/432; 252/439; 252/456

[58] Field of Search .................. 252/432, 455 R, 456, 252/439

[56] References Cited

U.S. PATENT DOCUMENTS

| | | | |
|---|---|---|---|
| 3,773,692 | 11/1973 | Hensel et al. | 252/455 R |
| 4,083,804 | 4/1978 | Saito et al. | 252/432 |
| 4,242,236 | 12/1980 | Blakely | 252/455 R |
| 4,280,929 | 7/1981 | Shaw et al. | 252/439 |

*Primary Examiner*—Carl F. Dees
*Attorney, Agent, or Firm*—J. E. Miller, Jr.; H. D. Knudsen; L. W. Evans

[57] ABSTRACT

Antimonate-based redox catalysts are produced by a single slurry technique using a silica sol and fumed silica to supply the catalyst support.

12 Claims, No Drawings

CATALYSTS

BACKGROUND OF THE INVENTION

The present invention relates to an improved process for producing antimonate-based catalysts and the improved catalysts so made.

Antimonate redox catalysts, that is redox catalysts in which the antimonate moiety forms the basic anionic structure of the system, are well known. They are exemplified, for example, in U.S. Pat. No. 3,431,292 and U.S. Pat. No. 3,338,952.

Usually, such catalysts are made by slurry techniques wherein source compounds containing the elements to be incorporated into the catalysts such as nitrates, oxides, acids and the like are combined in the form of a slurry, the liquid removed from the slurry to form a pre-catalyst and the pre-catalyst heated at elevated temperature to form the objective catalyst.

In order to impart strength (attrition resistance), it is customary to include in the catalyst a suitable support material. Silica, alumina, titania, zirconia and so forth are customarily used for this purpose. During catalyst preparation, these support materials are simply combined with the other source compounds in forming the pre-catalyst slurry.

SUMMARY OF THE INVENTION

In accordance with the invention, it has now been discovered that antimonate catalysts exhibiting superior catalytic properties and superior attrition resistance can be produced if the support material is composed of the combination of a catalyst support material derived from a sol and a fumed catalyst support material.

Thus, the present invention provides an improvement in the known single slurry process for producing a fluid bed catalyst comprising an antimonate-based oxide complex supported on a catalyst support in which (1) source compounds containing all of the elements of the oxide complex and the support material are combined to form a pre-catalyst slurry, (2) the liquid of the slurry is removed therefrom to form a pre-catalyst and (3) the pre-catalyst is heated at elevated temperature to form the catalyst, the improvement in accordance with the invention wherein the support material combined with the source compounds in step (1) is composed of a fumed catalyst support material and a catalyst support material sol.

DETAILED DESCRIPTION

Antimonate-Based Oxide Complex Catalyst

The present invention is applicable to the production of various antimonate-based redox catalysts. By "antimonate-based redox catalyst" is meant a catalyst which itself continuously gains and looses oxygen during the reaction and further in which the antimonate moiety forms the basic anionic structure of the material. Basically, such materials are metal antimonates wherein the metal is Fe, Sn, U, Th, Cr, Ti, Ce and/or Mn. Various additional promoters may be included in these systems, but usually the amount of promoter, if present, is less than twenty-five atom percent based on the amount of metal antimonate in the system.

These catalysts are well known in the art and described, for example, in U.S. Pat. No. 3,431,292, U.S. Pat. No. 3,338,952, U.S. Pat. No. 3,773,692, U.S. Pat. No. 4,083,804 and U.K. Published application No. 2,009,613A, the disclosures of which are incorporated herein by reference.

Normally, the antimonate redox catalyst to which the invention pertains will correspond to the following empirical formula:

$$A_a B_b Sb_c O_x$$

wherein
A is Fe, U, Sn, Th, Cr, Ti, Ce, Mg and/or Mn; and
B is Zr, V, W, Mo, As, B, Cu, Pr, Al, Te, rare earth metals, alkali metals, alkaline earth metals other than Mg and/or Bi, and further;
wherein
a is greater than 0 to 10, preferably 0.1 to 10;
b is 0 to 10, preferably 0.01 to 10;
c is 0.1 to 40, preferably 0.1 to 20; and
when A is other than Sn and/or Ti $a+b<c$
x is a number determined by the valence requirements of the other elements present.

In such catalysts the ratio b:a is usually 1:10 to 2:1, preferably 3:10 to 8:10 and $4b \leq a+c$. Also Fe and Sn are the preferred A components. Preferably $a+b<c$ in those catalysts in which A is other than Sn and/or Ti.

As is well known, antimonate-based catalysts can contain various other anionic-acting elements such as molybdenum and tungsten. However, in such instances the molybdenum and/or tungsten is present only as a promoter. To this end, the amount of molybdenum and/or tungsten present in an antimonate-based catalyst is normally less than 50 atom %, more typically less than 15% and even more typically less than 10% of the antimony content. This is merely a reflection of the fact that the catalyst are antimonate catalyst and not molybdates or tungstates.

SUPPORT MATERIALS

In accordance with the present invention, both the catalytic properties and the attrition resistance of fluid bed antimonate redox catalysts are improved by employing as the catalyst support the combination of a sol-derived catalytic support material and a fumed catalytic support material.

Both of these catalytic support materials are well known in the art and commercially available. A "sol-derived" catalytic support material is a catalytic support material which is available in the form of a colloidal slurry in a suitable liquid such as water. Silica sols are good examples of such materials. In addition to silica, other conventional support materials such as alumina, titania, zirconia and so forth are also available in sol form. Any such colloidal support material sol can be employed in accordance with the invention, although silica is preferred.

Fumed catalytic support materials are also well known. Basically, they are formed by an igneous process wherein a precursor compound is pyrolytically decomposed to form the support material.

A good example of such material is fumed silica, which is a very fine silica produced by reacting silicon tetrachloride with hydrogen and oxygen in a flame. This material is more fully described in *Encyclopedia of Chemical Technology*, 2nd. ed., Kurt Othmer, vol. 18, page 63. Fumed silica may be purchased under the trade name Aerosil or Cabosil. In addition to silica, other conventional support materials such as titania, zirconia, alumina and the like are also available in fumed form.

In carrying out the invention, the sol derived catalytic support material and the fumed catalytic support material may have the same or different compositions. Preferably, their compositions are the same. In a particularly preferred embodiment, silica sol and fumed silica are employed to form the support.

The relative amounts of the two diffent support materials can vary widely and essentially any amounts can be used. Normally, the amount of each component will be at least 5% based on the total weight of the support. More typically, each type of support material will be present in an amount of at least 10%, more preferably at least about 25% by weight, based on the combined weight of the support material. In a particularly preferred embodiment of the invention, the support system of the catalyst is composed of about 10 to 40% fumed silica the balance being silica sol, measured on a silica weight basis.

CATALYST PREPARATION TECHNIQUE

The catalysts of the invention are preferably formed in accordance with the conventional single slurry catalyst preparation technique. In this technique, source compounds such as nitrates, oxides, acids, anhydrides and the like containing all of the elements in the active catalytic material of the ultimate catalyst plus the support material are combined together in the form of a pre-catalyst slurry, the liquid phase of which is usually water. Next, the liquid is removed from the slurry to form a solid or gel pre-catalyst containing all of the components of the objective catalyst. The pre-catalyst is then heated at elevated temperature usually in the presence of air to decompose the source compounds and form the ultimate catalyst.

In this process, only a single aqueous slurry, the pre-catalyst slurry, need be formed. It is thus much simpler than other catalyst preparation processes such as two slurry step processes in which prior to making the pre-catalyst slurry a first slurry containing some but not all of the components of the catalyst is produced, the solids recovered therefrom and the solids mixed with other source compounds to form the pre-catalyst slurry.

The catalysts of the invention may also be made by a multi-slurry technique wherein more than one slurry is formed during catalyst preparation, although this is not preferred. See, for example, commonly assigned Ser. No. 76,115, filed Sept. 17, 1973 and now U.S. Pat. No. 4,280,929, which shows a multi-slurry technique for making a molybdate-based catalyst in which both fumed silica and a silica sol are used as a catalyst support. However in this patent it is essential that a first sol containing fumed silica and at least some of the components of the active catalytic material be dried to recover a solid and this solid then reslurried in a second slurry (pre-catalyst slurry) containing all of the catalyst ingredients. This technique is not used in the present invention. Specifically, if a multi-slurry technique is used for catalyst preparation, then catalyst preparation is accomplished without adding to the pre-catalyst slurry a slurry-derived solid containing fumed silica and an active component of the ultimate catalyst.

In a particularly preferred embodiment of the invention, the two different types of support material are premixed prior to combining with the other source compounds of the catalyst. This is particularly convenient on a commercial scale since a mixture of the two different support materials can be formulated in a separate location, for example, as by the support material manufacturer, and incorporated into the pre-catalyst slurry at the catalyst preparation plant.

Once the pre-catalyst slurry is formed in accordance with the present invention, it is processed in a conventional way to yield the catalysts of the invention. Specifically, the liquid is removed from the slurry as by filtration and/or evaporation to recover a pre-catalyst solid or gel, and the pre-catalyst is calcined at elevated temperature to form the objective catalyst.

UTILITY

The catalysts produced by the present are useful in various redox reactions. They find particular application in the ammoxidation of propylene or isobutylene to produce acrylonitrile and methacrylonitrile and the oxidation of olefins to produce unsaturated aldehydes and acids.

WORKING EXAMPLES

The following working examples are presented to more thoroughly illustrate the present invention.

COMPARATIVE EXAMPLE A

A catalyst having a formula essentially the same as Catalyst 4 in U.K. Published patent application No. 2,009,613A (40% by weight total silica) was prepared in the following manner. Ammonium tungstate, ammonium vanadate and ammonium molybdate were dissolved in water to form a first solution. A second solution comprising water acidified with $HNO_3$ and containing $Cu(NO_3)_2$, $Fe(NO_3)_3$ and tellurium oxide disolved therein was also prepared. A 40% silica sol (Nalco) diluted with an equal amount of water was mixed with the nitrate solution followed by the addition of antimony oxide. To the resultant slurry was added the W/V/Mo solution and the composition so obtained was neutralized with ammonium hydroxide to a pH of about 2.3. The slurry was digested and then dried and heated in air at 290° C. for three hours, 425° C. for three hours and 785° C. for about two hours.

The catalyst was then charged into a 1½ inch inside diameter fluid bed reactor and contacted with a feed comprising 1 propylene/1.05 $NH_3$/10 air at a WWH (weight propylene per unit weight catalyst per hour) of 0.10. The gross reaction product was recovered and analyzed. Acrylonitrile was produced with a yield (moles acrylonitrile produced per mold propylene fed×100) of 67.7% and the HCN yield was 4.1%.

EXAMPLE 1

Comparative Example A was repeated except that ¼ of the Nalco silica sol was replaced with fumed silica (on a silica weight basis). The catalyst obtained was tested in the same way as Comparative Example A and was found that acrylonitrile was produced with yields of 70.1% and HCN with yields of 4.9%.

The above examples show that the catalytic properties of catalysts produced in accordance with the invention and particularly the ability of the catalyst to produce useful products based on the amount of propylene fed is enhanced when the catalyst is made in accordance with the inventive technique.

COMPARATIVE EXAMPLE B AND EXAMPLES 2 to 4

Comparative Example A and Example 1 were repeated in a series of experiments in which the relative amounts of the silica sol and the fumed silica in the catalyst were varied. The product catalysts were then subjected to a standard attrition resistance test wherein a suitably sized fraction of each catalyst was vigorously aggitated in a tube equipped by an air jet. The amount of catalyst entrained in the air flow passing out of the tube indicates the percent attrition. Each catalyst was aggitated for twenty hours with an attrition test being conducted after five hours and again after twenty hours. The results are set forth in the following table:

TABLE 1

| EXAMPLE | SUPPORT MATERIAL | | % ATTRITION | |
|---|---|---|---|---|
| | % Silica Sol | % Fumed Silica | 5 Hrs. | 20 Hrs. |
| B | 100 | 0 | 13.8 | 16.0 |
| 2 | 75 | 25 | 14.0 | 11.6 |
| 3 | 50 | 50 | 12.7 | 2.0 |
| 4 | 25 | 75 | 3.6 | 0.0 |

From the forgoing table, it can be seen that the attrition resistance of the catalysts significantly increases when two different types of silica are used to form the support.

Although only a few embodiments of the invention have been illustrated above, many modifications can be made without departing from the spirit and scope of the invention. All such modifications are intended to be included within the scope of the invention, which is to be limited only by the following claims:

We claim:

1. In a single slurry process for producing a fluid-bed catalyst comprising an antimonate-based oxide complex supported on a catalyst support in which (1) source compounds containing all of the elements of said oxide complex and said support material are combined to form a pre-catalyst slurry, (2) liquid is removed from said pre-catalyst slurry to form a pre-catalyst, and (3) said pre-catalyst is heated at elevated temperature to form said catalyst, the improvement wherein the support material combined with said source compounds in step (1) is composed of (a) a fumed catalyst support material and (b) a catalyst support material sol.

2. The process of claim 1 wherein a silica sol and fumed silica are combined with said source compounds.

3. The process of claim 2 wherein said fumed silica and said silica sol are mixed together prior to being combined with said source compounds.

4. The process of claim 1 wherein said antimonate-based catalyst has the formula $$A_a B_b Sb_c O_x$$

wherein
A is Fe, U, Sn, Th, Cr, Ti, Ce, Mg and/or Mn; and
B is Zr, V, W, Mo, As, B, Cu, Pr, Al, Te, rare earth metals, alkali metals, alkaline earth metals other than Mg and/or Bi., and further;
wherein
a is greater than 0 to 10;
b is 0 to 10;
c is 0.1 to 40; and
when A is other than Sn and/or Ti, $a+b<c$
x is a number determined by the valence requirements of the other elements present.

5. The process of claim 4 wherein a is 0.1 to 10, b is 0.01 to 10 and c is 0.1 to 20.

6. The process of claim 5 wherein $4b \leq a+c$.

7. The process of claim 6 wherein A is Fe and/or Sn.

8. The process of claim 7 wherein b/c is 1/10 to 5/10.

9. The process according to 8 wherein b/c is 2/10 to 4/10.

10. The catalyst produced by the process of claim 1.

11. The catalyst produced by the process of claim 4.

12. In a process for producing a fluid-bed catalyst comprising an antimonate-based oxide complex supported on a catalyst support in which (1) source compounds containing all of the elements of said oxide complex and said support material are combined to form a pre-catalyst slurry, (2) the liquid removed from said pre-catalyst slurry to form a pre-catalyst, and (3) said pre-catalyst is heated at elevated temperature to form said catalyst, the improvement wherein the support material combined with said source compounds in step (1) is composed of (a) a fumed catalyst support material and (b) a catalyst support material sol, said pre-catalyst slurry being formed without the addition of a slurry-derived solid containing said fumed catalyst support material and one or more of said source compounds.

* * * * *